Oct. 14, 1930.  G. H. OSGOOD  1,778,120

LIGHT

Filed Nov. 21, 1928

Inventor
George H. Osgood
By
Attorney

Patented Oct. 14, 1930

1,778,120

UNITED STATES PATENT OFFICE

GEORGE H. OSGOOD, OF TACOMA, WASHINGTON

LIGHT

Application filed November 21, 1928. Serial No. 320,798.

My invention relates to lighting apparatus and especially to lights for use on automobiles and other vehicles using internal combustion engines, and further relates to lights wherein the illuminating element comprises a transparent tube containing a gas which glows when suitably energized by an electric current.

The objects of my invention are to provide a means for supporting the glowing tube in a vehicle lamp, first, whereby such tube will be firmly held therein without receiving damage from the shocks incident to the operation of the vehicle; second, whereby such supporting means reflects the light of the tube outward; third, whereby such supporting means together with the tube and the electrical conductors thereto form a single structure which is readily inserted in or removed from the lamp; and fourth, which is cheap to make and effective in use. Further objects are to provide means to energize the gas in the tube by connecting it to the high tension circuit of the sparking system of the operating engine; and to provide a control whereby the engine and the light may be operated independently of each other.

I attain these and other objects by the devices and arrangements illustrated in the accompanying drawings, in which—

Similar numerals of reference refer to similar parts throughout the several views.

Figures 1, 2, 3, 4:
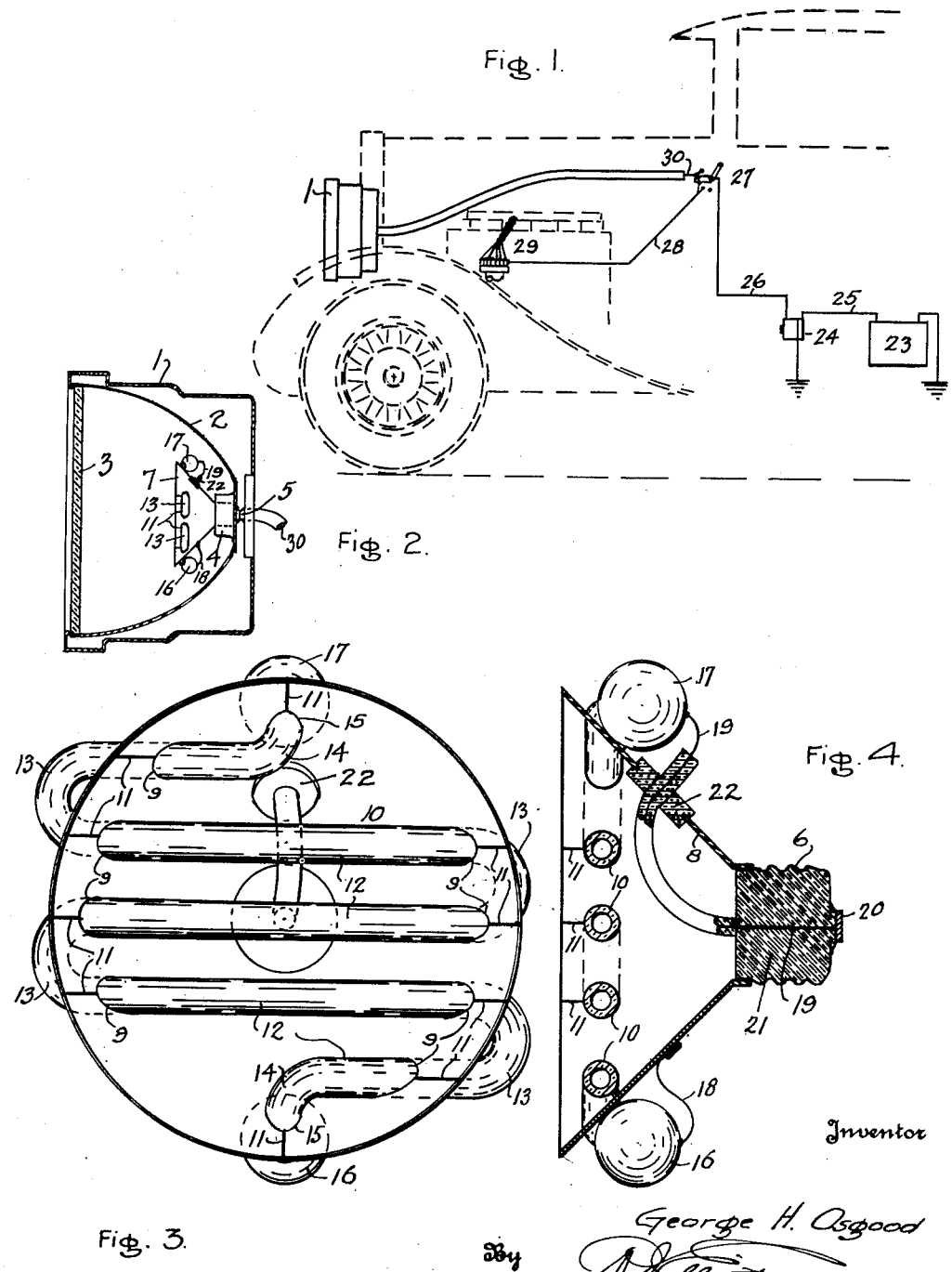
Fig. 1 is a diagrammatic view indicating the connections between my improved light and the sparking circuit of an automobile.
Fig. 2 is a vertical section of an automobile lamp having my improved light mounted therein.
Fig. 3 is a front elevation of my improved light.
Fig. 4 is a section thereof.

The operation of any swiftly moving vehicle in fog and other conditions of low visibility, is accompanied with constant danger and therefore it is usually necessary for such vehicles to move forward at a slow pace and with extreme caution and, to that extent, the advantage of such vehicles is destroyed. This condition of low visibility can be overcome, in some degree, by using a light ray which will penetrate the fog and which will indicate to the driver a condition of danger located at a further distance than can be done without the aid of such a light. It is a well known fact that lights giving a predominance of red or infra-red rays have a far greater ability to penetrate a fog than the ordinary electric light. The rays given out by certain gases, such as neon, when energized and caused to glow by an electric current of high tension are of this desirable nature.

However there are several problems of a special nature to be solved in bringing the glowing gas light into practical operation on an automobile. First such a light must be mounted in a very small space; must not require the separate disconnecting of the electric circuit wires by which it is energized, when it is to be removed from the lamp; must be easily removed from or inserted in a lamp; and must be mounted in such manner as to be firmly held in place. And also, it is necessary to provide a circuit of high electric tension in order to energize the gas and to cause it to glow.

It is not practical to independently produce this high voltage in a car, for the sole purpose of supplying the energy for the light. This difficulty is solved in my invention by connecting the light to the high tension sparking circuit of the engine of the automobile. There are also the further problems of controlling the circuits so that either or both the engine and/or the light may be operated at any time; and also the problem of making the light since the tube must be bent before it is attached to the carrying body, and such construction must be cheap to make and must firmly hold the tube from motion or vibration therein.

It will be seen by the drawings that the lamp 1 of the automobile may be of the usual construction and mounted in any position thereon. Such a lamp 1 is provided with a reflector 2 of appropriate shape and with a lens 3. It is also provided with a light socket 4 at its inner end, adapted to receive the usual light bulb, and with a contact point 5, suitably insulated from the metal of the lamp, adapted to contact with the contact button of such light bulb.

In my improved light I may utilize such apparatus as above described but I provide a special light body (Figs. 2, 3 and 4) which comprises a support or carrier and a suitable gas tube mounted thereon, which said light body is provided with a plug end 6 adapted to be screwed in the socket 4 instead of the usual electric light bulb, and which includes suitable conductors between the plug 6 and the gas tube.

A metal carrier cone 7 is secured to the plug 6 and its inner surface 8 is suitably coated or polished to form a reflector. The outer part of the cone 7 is provided with a series of suitable holes 9, each adapted to permit a part of the tube 10 of the light to pass tightly therethrough. The outer edge of the cone 7 is slit at a plurality of places 11, each such slit 11 leading to one such hole 9 therein.

As shown in the drawings, the neon gas tube 10 is bent to form a series of parallel sections 12 joined by curved portions 13, but it is understood that the particular arrangement of such bends may be varied to suit the conditions or fancy of the manufacturer. It is, however, desirable to have a plurality of such straight sections 12 in close proximity in order to concentrate the light emitted thereby. As shown in the drawings the ends of the tube 10 are bent outward at 14 to pass tightly through the two holes 15 in the carrier cone 7, at substantially opposite points therein, such holes 15 being well removed from the other holes 9 above described. Thus the tube 10 is supported against vertical motion by the holes 9 and against transverse motion by the holes 15, and is therefore firmly held in place by such construction.

The tube 10 is provided with suitable bulbs 16 and 17 at its ends, such bulbs being positioned just outside of the cone 7 and adjacent to the bends 14 therein. The bulb 16 is provided with a terminal wire 18 secured to or grounded on the outside of the metal carrier cone 7. The bulb 17 is provided with a terminal wire 19, suitably insulated from the carrier cone 7 and leading to the contact head 20, secured on the end of the plug 6. The wire 19 passes through the insulation 21 of the plug 6 to the inner side of the cone 7 and thence outward through a suitably insulated opening 22 in the cone 7 to the said bulb 17, thus connecting the contact head 20 with the said tube bulb.

The tube 10 is placed in the carrier cone 7 in the following manner:—The tube 10 is first shaped to the desired form, corresponding with the holes 9 and 15 in the cone 7, then the edges of the cone 7 at each slit 11 are bent inward to open connection with said holes 9 and 15, then the tube 10 is passed into said holes through the openings made by said slits, and the edges are bent back into normal position and firmly hold the tube from motion therein.

The wiring system is indicated diagrammatically in Fig. 1 and comprises a source of electric energy, represented by the battery 23, connected to the low tension side of the transformer 24, by a wire 25. The high tension wire 26 leads from the transformer 24 to the switch 27. A wire 28 leads from one terminal of the switch to the engine sparking system, indicated at 29, and a wire 30 leads from another terminal of the switch to the contact point 5 of the lamp.

The switch 27 may be of any suitable form but must be adapted to connect or disconnect either or both said wires 28 and 30 with the wire 26. When the above described plug 6 of the light is screwed in the socket 4, the head 20 of the plug engages the contact point 5 in the socket. It is understood that the lamp 1, together with the socket 4, is grounded to the framework of the machine, by which means the circuit is completed through the grounding of the transformer 24 in the usual way.

The energy therefore use in my improved light is derived from the sparking circuit of the automobile engine and is connected in parallel with the portion of said circuit in which the spark plugs thereof are placed.

Having, therefore, described my invention, what I claim is:—

1. A fog light comprising a lamp body provided with a light-receiving socket; a metallic reflector cone screwed into said socket and rigidly supported thereby; a transparent gas-filled tube mounted on said cone and extending across its mouth on a plurality of lines; electric connections between the portions of said socket and the terminals of said gas-filled tube; and high-tension electric means for energizing the gas in said tube through said socket and electric connections.

2. A fog light comprising a lamp body provided with a light-receiving socket; a metallic reflector cone provided with a plurality of tube-receiving holes and screwed into said socket and rigidly supported thereby; a transparent gas-filled tube passing through the holes in said cone and extending across its mouth on a plurality of lines; electric connections between the portions of said socket and the terminals of said gas-filled tube; and high-tension electric means for energizing the gas in said tube through said socket and electric connections.

GEORGE H. OSGOOD.